ARRANGEMENT FOR TOUCH-FREE MEASUREMENT OF DISPLACEMENTS
Filed Nov. 3, 1967 3 Sheets-Sheet 1

INVENTOR.
DIETRICH MEYER
BY
Frank R. Jifari
AGENT

INVENTOR.
DIETRICH MEYER
BY
Frank R. Jeffery [signature]
AGENT

Nov. 18, 1969   D. MEYER   3,479,582
ARRANGEMENT FOR TOUCH-FREE MEASUREMENT OF DISPLACEMENTS
Filed Nov. 3, 1967   3 Sheets-Sheet 2

INVENTOR.
BY
AGENT

INVENTOR.
DIETRICH MEYER
BY
AGENT

United States Patent Office 3,479,582

Patented Nov. 18, 1969

3,479,582

ARRANGEMENT FOR TOUCH-FREE MEASUREMENT OF DISPLACEMENTS

Dietrich Meyer, Hamburg, Germany, assignor, by mesne assignments, to U.S. Philips Corporation, New York, N.Y., a corporation of Delaware Filed Nov. 3, 1967, Ser. No. 680,385

Claims priority, application Germany, Nov. 16, 1966, P 40,810

Int. Cl. G01r *33/02*

U.S. Cl. 324—34 15 Claims

ABSTRACT OF THE DISCLOSURE

A device for measuring the displacement of a body movable in two orthogonal directions. The device includes a ferromagnetic element secured to the body and a pair of ferromagnetic cores arranged adjacent said element to define a pair of air gaps therewith that vary in opposite sense with the displacement of said body. The coils are energized to derive first and second currents proportional to the admittances thereof. The currents are combined to produce first and second signals proportional to the sum and difference thereof. The signals are a measure of the body movement in the two orthogonal directions, and each is independent of the body movement in the other orthogonal direction.

Figure 1A:
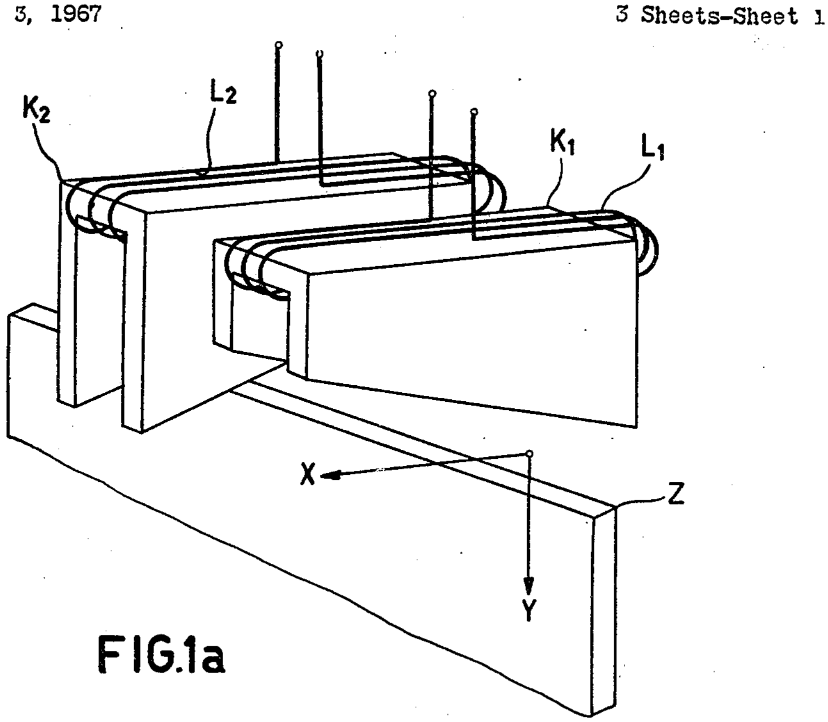

The present invention relates to an arrangement for measuring displacements. Particularly for measuring displacements along two orthogonal co-ordinates by means of inductive pick-ups without virtual contact.

Pick-ups for contact free measurement of displacements, for example, of rotating shaft, are known. They are formed inter alia by differential choke arrangements. However, they have the disadvantage that the output magnitude is linearly related to the measuring magnitude only when the field distribution may be considered to be homogeneous. This requirement reduces, however, the application to the measurement of small displacements, if the measuring pick-up should not have a great extent in the plane at right angles to the direction of the displacement to be measured. Moreover, this principle of measurement permits only the measurement of displacements along one co-ordinate by each pick-up.

The invention has for an object to provide a pick-up for displacement measurements, for example, on rotating shafts, the bulk of which is not large as compared with the measuring range. Moreover, this pick-up has to provide an output magnitude which is proportional to the displacement along only one co-ordinate, in the case of a shaft for, example, in the direction of length of the shaft, and which is independent of displacements along all further co-ordinates, as well as a further output magnitude which is proportional to a displacement along only one co-ordinate at right angles to the former and which is also independent of displacements along all further co-ordinates.

According to the invention, this is achieved by arranging or constructing the pairs of pole pieces of two ferromagnetic coil cores, arranged opposite a tongue of ferromagnetic material secured to the measuring object, so that during a displacement of the measuring object in one of the measuring directions the lengths of the air gaps between the pole pieces and the tongue vary in opposite senses. In addition, means are provided for measuring the sum or the difference of the inductive admittances of the coils wound on the cores.

As an alternative to the variations of the lengths of the air gaps obtained by the shape or the arrangement of the pairs of pole shoes, a variation of the widths of the air gaps between the tongue and the pairs of pole shoes obtained by the shape and/or the disposition of the pairs of pole pieces may be employed with the same result.

Figures 1B, 1C:
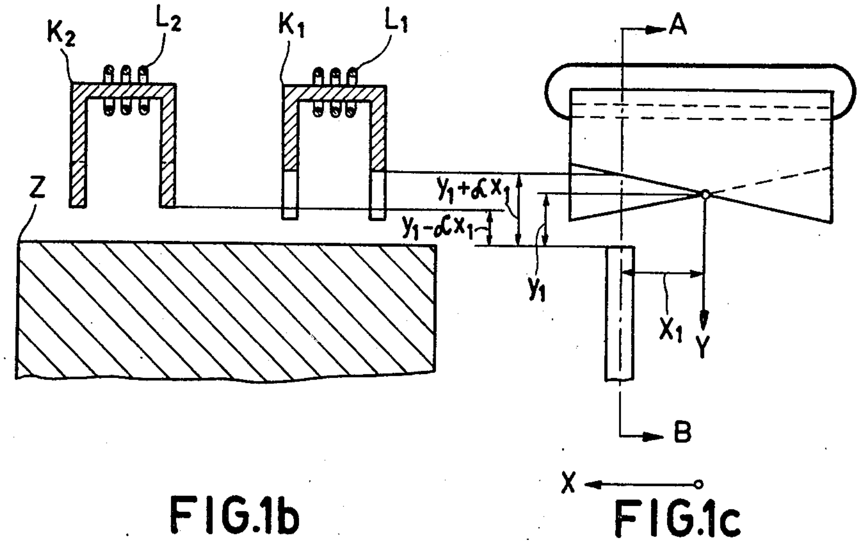
Figures 2, 3, 6:
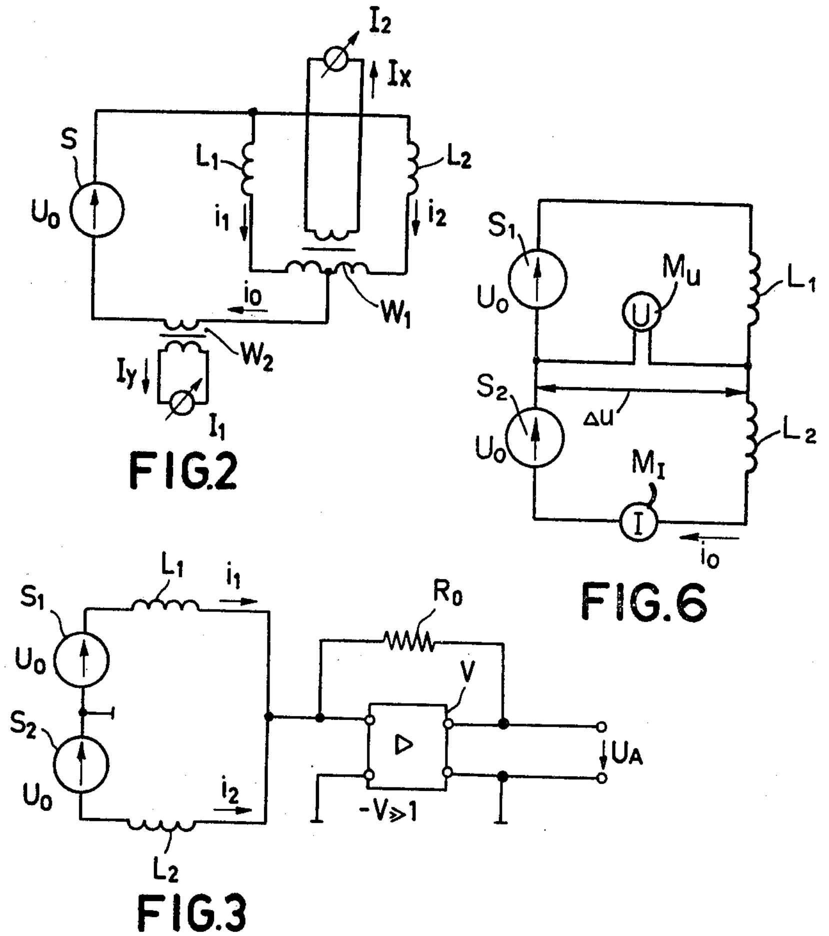
Figure 4:
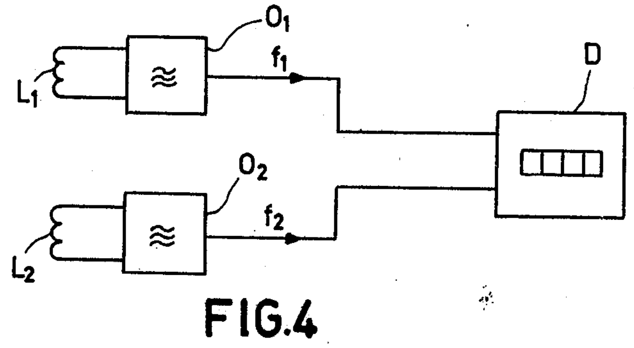
Figure 5A:
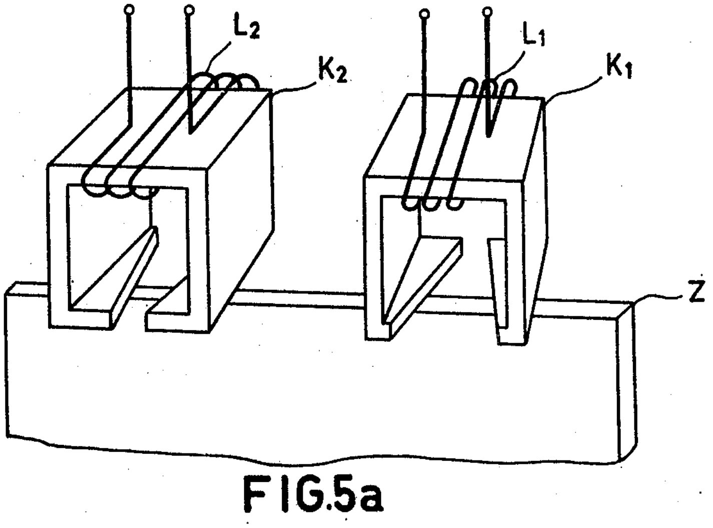
Figure 5B:
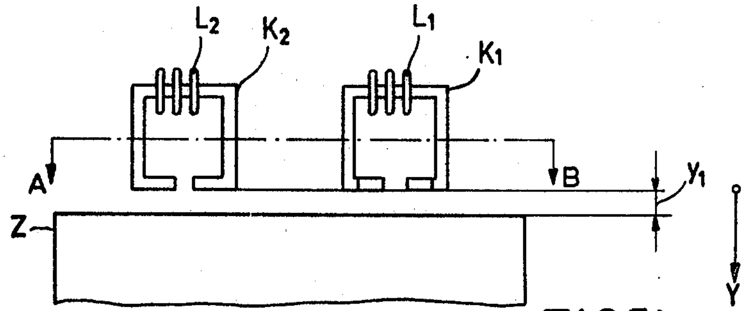
Figure 5C:
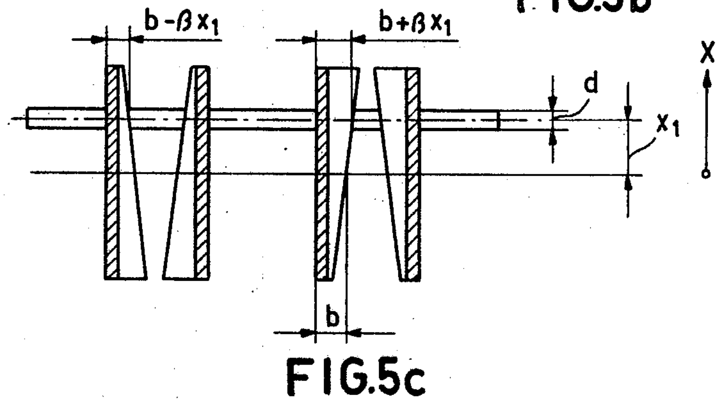

The invention will be described with reference to the drawing, in which:

FIGS. 1*a*, 1*b*, 1*c* show one embodiment of a measuring pick-up according to the invention, FIG. 2 shows one embodiment of a measuring arrangement comprising current converters, FIG. 3 shows one embodiment of a measuring arrangement comprising summation amplifiers, FIG. 4 shows on embodiment of a measuring arrangement comprising controlled oscillators and digital sum/difference frequency measuring members, FIGS. 5*a*, 5*b*, 5*c* show a further embodiment of a measuring pick-up according to the invention, and FIG. 6 shows one embodiment of a measuring bridge arrangement.

An embodiment of an inductive displacement measuring pick-up according to the invention is shown in FIGS. 1*a*, 1*b* and 1*c*.

A ferromagnetic tongue Z, secured to the measuring object (not shown), which may be a rotating shaft around which this tongue is arranged, moves by an average distance $y_1$ beneath the pole pieces of two U-shaped, ferromagnetic coil cores $K_1$ and $K_2$. The pole pieces are inclined in opposite senses in the direction of measurement $x$, for example, in the direction of length of a shaft, so that when the measuring object moves by $x_1$ in the $x$-direction, the air gaps between the coil core $K_1$ and the tongue Z are enlarged by $\alpha x_1$, whereas the air gaps between the coil core $K_2$ and the tongue Z are diminished by $\alpha x_1$. The constant $\alpha$ is dependent on the slope of the faces of the pole pieces.

If the coils $L_1$ and $L_2$ surrounding the two cores have a number of turns N, and if it is assumed that the reluctance of the magnetic circuits is determined only by the size of the air gaps, the inductances $H_1$ and $H_2$ of the coils $L_1$ and $L_2$, respectively, are:

$$H_1=\frac{\mu_0 F N^2}{2(y_1+\alpha x_1)} \quad (1)$$

$$H_2=\frac{\mu_0 F N^2}{2(y_1-\alpha x_1)} \quad (2)$$

The cross-sectional area F of the air gaps is determined by the wall thickness of the coil cores and of the tongue Z. In the above equations, $\mu_0$ is the permeability constant ($4\pi\times10^{-7}$) and $x_1$ and $y_1$ are the body displacements in the $x$ and $y$ directions, as shown in FIGS. 1*b* and 1*c*.

$$B_1=\frac{1}{j\omega H_1}=\frac{2}{j\omega\mu_0 F N^2}(y_1+\alpha x_1) \quad (3)$$

$$B_2=\frac{1}{j\omega H_2}=\frac{2}{j\omega\mu_0 F N^2}(y_1-\alpha x_1) \quad (4)$$

so that the difference between the admittances:

$$\Delta B = B_1 - B_2 = \frac{2}{j\omega\mu_0 F N^2} \cdot 2\alpha_1 = \text{const. } x_1 \quad (5)$$

is proportional to the displacement in the $x$-direction and is independent of a displacement in the $y$-direction, whereas the sum of the admittances:

$$B_1 + B_2 = \frac{2}{j\omega\mu_0 F N^2} \cdot 2y_1 = \text{const. } y_1 \quad (6)$$

depends only upon the displacement in the $y$-direction and does not depend upon a displacement in the $x$-direction.

Several circuits for measuring the difference or the sum of the inductive admittances are illustrated in FIGS. 2 and 3. If the amplitude of the alternating voltage $\mu_0$ is constant, then the currents $i_1$ and $i_2$ passing through the coils $L_1$ and $L_2$ are proportional to the inductive admittances $B_1$ and $B_2$ of the coils.

FIG. 2 shows an arrangement in which the two coils $L_1$ and $L_2$ are connected to the same voltage sources S and the currents $i_1$ and $i_2$ pass through the primary windings of a difference current transformer $W_1$. The output current $I_x$ thereof is proportional to the difference between the coil currents, $\Delta_1 = i_1 - i_2$ and, for a constant alternating voltage $U_0$, is proportional to the difference between the inductive admittances, $\Delta B = B_1 - B_2$. At the same time a second current transformer $W_2$, whose primary winding is traversed by the sum current $i_0 = i_1 + i_2$ provides an output current $I_y$ which is proportional to the sum of the inductive admittances $(B_1 + B_2)$.

FIG. 3 shows a further arrangement in which the coils $L_1$ and $L_2$ are connected to a counterphased A.C. voltage source $S_1$, $S_2$. The currents $i_1$ and $i_2$ passing through the coils are fed to the input of an operational amplifier V, connected as a summation amplifier. The amplifier output voltage $U_A$ is proportional to the sum of the input currents and hence to the difference between the inductive admittances.

$$U_A = R_0(i_1 + i_2) = R_0[U_0 B_1 + (-U_0) B_2] = R_0 \cdot U_0 \cdot \Delta B \quad (7)$$

If the sum of the inductive admittance is to be measured, a reversing switch can be employed that changes over from a counterphased to an in phase supply so that:

$$U_A = R_0(i_1 + i_2) = R_0[U_0 B_1 + U_0 B_2] = R_0 U_0 (B_2 + B_2) \quad (8)$$

If the counterphased voltage-source is formed by a push-pull transformer, the primary current $i_p$ thereof is a meas ure for the sum of the inductive admittances, since:

$$i_P = \ddot{u}(i_1 - i_2) = \ddot{u} \cdot [U_0 \cdot B_1 - (-U_0) B_2] = \ddot{u} U_0 (B_1 + B_2) \quad (9)$$

in which ü designates the transformation ratio of the transformer.

Therefore, it is possible to measure simultaneously the difference between the inductive admittances of Equation 7 and the sum of the inductive admittances of Equation 9.

A further measuring arrangement is shown in FIG. 4. Each of the two coils $L_1$ and $L_2$ serves as a frequency determining element of an individual, appropriate oscillator circuit $O_1$ and $O_2$, respectively, so that the frequencies therefore:

$$f_1 = \frac{1}{H_1} \times \text{constant} \quad (10)$$

and $$f_2 = \frac{1}{H_2} \text{ constant} \quad (11)$$

By utilizing the difference or the sum of the frequencies $f_1$ and $f_2$, for example, by means of the sum/difference counter D, output magnitudes proportional to the measuring magnitudes $x_1$ or $y_1$, respectively, can be obtained.

Apart from the possibility of using wedge-shaped air gaps by suitable machining of the pole pieces, as is shown in FIG. 1, there is a possibility of using coil cores having a profile which is constant in the $x$-direction and of obtaining wedge-shaped air gaps by appropriate inclination of the two coil cores relative to each other.

Instead of a variation of the elngths of the air gaps, a variation of the widths of the air gap upon a displacement of the measuring object may be carried out in a variant of an arrangement according to the invention, as shown in FIGS. *5a*, *5b*, *5c*. A tongue Z of a thickness $d$ of ferromagnetic material, connected with the measuring object, moves over a distance $y_1$ beneath the pole pieces of two ferromagnetic coil cores $K_1$ and $K_2$. The pole pieces widen uniformly in opopsite senses so that upon a displacement of the measuring object by $x_1$ in the $x$-direction, the area $F_1$ of the air gap of the coil core $K_1$:

$$F_1 = d(b + \beta \times x_1) \quad (12)$$

is enlarged and the area of the air gap $F_2$ of the coil core $K_2$ is diminished by:

$$F_2 = d(b - \beta x_1) \quad (13)$$

The constant $\beta$ is dependent on the slope of the pole pieces. The coils $L_1$ and $L_2$, wound around the cores and having a number of turns N, then have the inductances:

$$H_1 = \frac{u_0 N^2 d(b + \beta x_1)}{2y_1} \quad (14)$$

$$H_2 = \frac{u_0 N^2 d(b - \beta x_1)}{2y_1} \quad (15)$$

It is assumed that the reluctance of the two magnetic circuits is determined only by the size of the air gaps.

In this arrangement, the relative difference between the inductances $\Delta H / H_{ges}$:

$$\Delta H = H_1 - H_2 \quad (16)$$

$$H_{ges} = H_1 + H_2 \quad (17)$$

is proportional to the displacement in the $x$-direction and is dependent of a displacement in the $y$-direction:

$$\frac{\Delta H}{H_{ges}} = \frac{\beta}{b} \times x_1 = \text{const. } x_1 \quad (18)$$

At the same time, the inductive admittance of the series combination of the two inductors is:

$$B_{ges} = \frac{1}{j\omega H_{ges}} = \frac{y_1}{j\omega\mu_0 N^2 db} = \text{const. } y_1 \quad (19)$$

dependent only upon a displacement in the $y$-direction and is independent of a displacement in the $x$-direction.

A circuit for measuring the relative difference and simultaneously the inductive admittance of the sum of the inductors is illustrated in FIG. 6. A counterphased voltage source formed by the two voltage sources $S_1$ and $S_2$, each having a constant alternating voltage $U_0$ and the series combination of the coils $L_1$ and $L_2$, are arranged to form a bridge. The voltage sources produce across the coils a current proportional to the inductive admittance of the sum of the inductors:

$$i_0 = U_0 \cdot B_{ges} = y_1 x \quad (20)$$

constant which may be measured by means of a current meter $M_1$.

The diagonal voltage $\Delta U$ of the bridge $\Delta U$ is proportional to the relative difference between the inductors:

$$\Delta U = U_0 \frac{H_2}{H_1 + H_2} \cdot 2U_0 = U_0 \cdot \frac{\Delta L}{H_{ges}} = K x_1 \quad (21)$$

and may be measured by means of a voltage meter $M_U$.

What is claimed is:

1. An electric measuring device for measuring the displacement of a body movable along two orthogonal coordinate directions $x$ and $y$ comprising, a ferromagnetic element coupled to said body to follow the movement thereof along said two directions, a first ferromagnetic core arranged adjacent said element to define an air gap therewith that varies in one sense with displacement of body along one of said coordinate directions, a second ferromagnetic core arranged adjacent said element to define a second air gap therewith that varies in the opposite sense with the displacement of said body along said one direction, first aind second coils wound on said first and second cores, respectively, said coils exhibiting a variation in their inductive admittance with a variation in the air gap associated with their respective cores, means for energizing said coils to derive first and second electrical quantities that vary with the admittance of said first and second coils, respectively, and means responsive to said first and second electrical quantities for producing a resultant signal that is proportional to the movement of the body along said one direction and which is independent of the body movement along the other coordinate direction.

2. A device as claimed in claim 1 wherein said signal producing means comprises means for combining said first and second electrical quantities to produce a signal proportional to the sum thereof, said sum signal being directly proportional to the displacement of the body in the *y* direction.

3. A device as claimed in claim 2 wherein said coil energizing means comprises a source of alternating voltage of constant amplitude connected in common to said first and second coils, said first and second electrical quantities comprising the individual currents flowing in said first and second coils, said signal producing means comprising a current meter and means for additively supplying the individual coil currents thereto.

4. A device as claimed in claim 2 wherein said coil energizing means comprises a source of alternating voltage connected to said first and second coils, said first and second electrical quantities comprising the individual currents flowing in said first and second coils, said signal producing means comprising a negative feedback operational amplifier having input and output terminals, and means for applying the sum of the coil currents to said input terminals whereby a voltage is produced at said output terminals that is proportional to the sum of the coil currents and thereby to the sum of the inductive admittances of said coils.

5. A device as claimed in claim 1 wherein said signal producing means comprises means for combining said first and second electrical quantities to produce a signal proportional to the difference thereof, whereby the displacement of the body in the *x* direction is determined.

6. A device as claimed in claim 5 wherein said coil energizing means comprises a source of alternating voltage of constant amplitude and means connecting said first and second coils in parallel to said voltage source, said first and second electrical quantities comprising the individual currents flowing in said first and second coils, said signal producing means comprising a transformer having a pair of primary windings and a secondary winding coupled to a current meter, and means for coupling said pair of primary windings to said first and second coils in a sense so that a current proportional to the difference of the coil currents flows in said secondary winding and in said current meter.

7. A device as claimed in claim 5 wherein said coil energizing means comprises a source of alternating voltage that supplies first and second out of phase voltage components and means connecting said first and second coils to said voltage source, said first and second electrical quantities comprising the individual currents flowing in said first and second coils, said signal producing means comprising a negative feedback operational amplifier having input and output terminals, means for applying the sum of the coil currents to said input terminals whereby a voltage is produced at said output terminals that is proportional to the sum of the coil currents and thereby to the difference between the inductive admittances of said coils.

8. A device as claimed in claim 7 wherein said voltage source comprises a transformer having a primary winding and a center tapped secondary winding, means for coupling said primary winding to said coils so that the sum of the coil currents flows therein, and means for coupling the input terminals of said amplifier to said transformer secondary winding.

9. A device as claimed in claim 1 wherein said signal producing means comprises means for combining said first and second electrical quantities to produce first and second signals proportional to the sum and difference thereof, whereby the displacement of the body in the *y* and *x* directions, respectively, is determined independently of the body movement in the *x* and *y* directions, respectively.

10. A device as claimed in claim 9 further comprising first and second oscillators, means coupling said first and second coils in circuit with said first and second oscillators, respectively, so that said coils control the oscillation frequencies thereof, said frequencies being each proportional to the reciprocal of the inductance value of their respective coils, and wherein the combining means of said signal producing means comprises means for deriving first and second signals of the sum and difference frequencies of the oscillation frequencies of said first and second oscillators.

11. A device as claimed in claim 9 wherein each of said cores are U-shaped and have a pair of pole pieces confronting said ferromagnetic element and inclined in opposite senses along the *x* direction of measurement so that the lengths of said first and second air gaps vary in opposite senses as the body moves in the *x* direction.

12. A device as claimed in claim 11 wherein said cores are both mounted on the same side of said element and each comprise a pair of wedge-shaped pole pieces.

13. An electric measuring device for measuring the displacement of a body movable along two orthogonal coordinate directions *x* and *y* comprising, a ferromagnetic element coupled to said body to follow the movement thereof, a first ferromagnetic core arranged adjacent said element to define an air gap therewith that varies in width in one sense with displacement of said body along one of said coordinate directions, a second ferromagentic core arranged adjacent said element to define a second air gap therewith that varies in width in the opposite sense with the displacement of said body along said one direction, first and second coils wound on said first and second cores, respectively, means for energizing said coils to derive first and second electrical quantities that are determined by the size of said first and second air gaps, respectively, and means for combining said first and second electrical quantities to produce first and second signals proportional to the relative difference of the inductances of said first and second coils and to the inductive admittance of the sum of the inductances of said first and second coils, respectively.

14. A device as claimed in claim 13 wherein said energizing means comprises a counterphased source of AC voltage having a pair of end terminals and a center junction terminal, and wherein said combining means comprises means connecting said first and second coils in series across the end terminals of said voltage source to form a bridge circuit therewith in which the voltage between said center junction and the junction of said coils is proportional to the relative difference of the inductances of said coils and the series current flowing in the bridge circuit is proportional to the inductive admittance of the sum of the inductances of said coils.

15. A device as claimed in claimed in claim 13 wherein said cores are both positioned on the same side of said element and each comprise a U-shaped member having confronting pole pieces that define a wedge-shaped air gap therebetween.

(References on following page)

References Cited

UNITED STATES PATENTS

| | | | |
|---|---|---|---|
| 2,340,609 | 2/1944 | Mestas | 324—34 X |
| 2,393,717 | 1/1946 | Speaker. | |
| 2,526,338 | 10/1950 | Ehlschlager | 324—34 |
| 2,939,072 | 5/1960 | Bell | 324—34 |
| 3,281,809 | 10/1966 | Andersson | 324—34 X |

FOREIGN PATENTS

| | | |
|---|---|---|
| 903,171 | 8/1962 | Great Britain. |
| 1,274,619 | 9/1961 | France. |

RUDOLPH V. ROLINEC, Primary Examiner

A. E. SMITH, Assistant Examiner

U.S. Cl. X.R.

340—199, 282